United States Patent
Little (10) Patent No.: US 10,425,778 B2
(45) Date of Patent: *Sep. 24, 2019

(54) DISTRIBUTED TRANSACTIONS ON MOBILE DEVICES VIA A MESSAGING SERVICE PROVIDED BY A MOBILE NETWORK OPERATOR

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/432,192

(22) Filed: Feb. 14, 2017

(65) Prior Publication Data
US 2017/0153911 A1   Jun. 1, 2017

Related U.S. Application Data

(63) Continuation of application No. 12/074,206, filed on Feb. 28, 2008, now Pat. No. 9,578,471.

(51) Int. Cl.
*H04W 4/12* (2009.01)
*G06F 9/46* (2006.01)
(Continued)

(52) U.S. Cl.
CPC .............. *H04W 4/12* (2013.01); *G06F 9/466* (2013.01); *H04L 45/745* (2013.01); *H04L 51/10* (2013.01); *H04L 51/38* (2013.01); *H04W 8/26* (2013.01)

(58) Field of Classification Search
CPC ...... H04L 51/38; H04L 12/5895; H04W 4/12; G06F 9/466
See application file for complete search history.

(56) References Cited

U.S. PATENT DOCUMENTS 5,924,095 A   7/1999   White
6,738,971 B2   5/2004   Chandrasekaran et al.
(Continued)

OTHER PUBLICATIONS

Samaras, George, et al., "Two-Phase Commit Organizations and Tradeoffs in the Commercial Environment" pp. 520-529, 1063-6382/93 Copyright 1993 IEEE.
(Continued)

*Primary Examiner* — Keith E Vicary
(74) *Attorney, Agent, or Firm* — Lowenstein Sandler LLP (57) ABSTRACT

A method includes receiving, by a mobile device associated with a distributed transaction, a message via a messaging service provided by a mobile network operator. The method further includes determining, by a content based router of the mobile device, that the message is associated with the distributed transaction by determining that the message includes a transaction identifier that corresponds with an entry in a transaction table of the content based router. The entry identifies the distributed transaction and a destination of where to forward the message. The method further includes forwarding, by a processing device of the mobile device, the message to a resource manager resident on the mobile device. The resource manager corresponds to the destination of where to forward the message. The method further includes performing, by the resource manager, an action associated with the distributed transaction in view of contents of the message.

20 Claims, 5 Drawing Sheets

(51) Int. Cl.
*H04L 12/58* (2006.01)
*H04L 12/741* (2013.01)
*H04W 8/26* (2009.01)

(56) References Cited

U.S. PATENT DOCUMENTS

| | | | |
|---|---|---|---|
| 9,578,471 B2 * | 2/2017 | Little | G06F 9/466 |
| 2004/0006538 A1 | 1/2004 | Steinberg et al. | |
| 2005/0204003 A1 | 9/2005 | Vargas et al. | |
| 2005/0262182 A1 | 11/2005 | Thole | |
| 2006/0148495 A1 | 7/2006 | Wilson | |
| 2006/0149791 A1 | 7/2006 | Sinha et al. | |
| 2007/0087765 A1 | 4/2007 | Richardson et al. | |
| 2007/0232292 A1 | 10/2007 | Larocca | |

OTHER PUBLICATIONS

Wilson (Distributed Transaction and Two-Phase Commit): SAP White Paper: 2003; 39 pages.
Narasayya (Distrubted Transactions in a Mobile Computing System); Technical Report. Depart. of Computer Science, University of Washington; Mar. 9, 1994; 13 pages.
Xie (Supporting Distributed Transaction Processing Over Mobile and Heterogeneous Platforms); Georgia Institute of Technology Dissertation; Dec. 2005; 151 pages.
"JBoss Transactions 4.2.3, JTS Programmers Guide", © 2006, 117 pages.
Johnson, Rod, et al., "Spring java/j2ee Application Gramework, The Spring Framework-Reference Documentation", Version 2.5.6, © 2004-2008, 590 pages.

* cited by examiner

DISTRIBUTED TRANSACTIONS ON MOBILE DEVICES VIA A MESSAGING SERVICE PROVIDED BY A MOBILE NETWORK OPERATOR

PRIORITY CLAIM

This application is a continuation of U.S. patent application Ser. No. 12/074,206, filed on Feb. 28, 2008, the entire content is hereby incorporated by reference.

TECHNICAL FIELD

Embodiments of the present invention relate to distributed transactions, and more specifically to distributed transactions that include at least one participant or coordinator that is resident on a mobile phone.

BACKGROUND

Mobile phones have become widely used throughout the world. Each generation of mobile phones has greater processing power and more functions than previous generations. However, applications that run on mobile phones are not capable of participating in distributed transactions, either with applications on other mobile phones, or with applications on servers.

Distributed transactions are often performed on distributed computing systems. A distributed transaction is a set of operations that update shared objects. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

To ensure the Atomicity property, all participants of the distributed transaction must coordinate their actions so that they either unanimously abort or unanimously commit to the transaction. A two-phase commit protocol is commonly used to ensure Atomicity. Under the two-phase commit protocol, the distributed system performs the commit operation in two phases. In the first phase, commonly known as the prepare phase or request phase, a coordinator node (a node in the distributed computing system managing the transaction) asks all participant nodes whether they are willing to commit to the transaction. During the second phase, commonly known as the commit phase, the coordinator node determines whether the transaction should be completed. If during the prepare phase all participant nodes committed to the transaction, the coordinator node successfully completes the transaction. If during the prepare phase one or more participant nodes failed to commit to the transaction, the coordinator node does not complete the transaction.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for performing distributed transactions using mobile phones. In one embodiment, a message is received by a mobile phone via a messaging service provided by a mobile network operator. The messaging service is preferably supported by the mobile phone. A logic component of the mobile phone (e.g., a content based router) determines whether the message is associated with a distributed transaction. The message is forwarded to a resource manager resident on the mobile phone if the message is associated with the distributed transaction. If the message is not associated with the distributed transaction, the message is forwarded to a message inbox from which a user of the mobile phone can view the message. The resource manager performs an action upon receiving the message based on contents of the message. The performed action may be associated with the distributed transaction. Examples of such actions include committing a state change, rolling back a state change, voting whether or not to commit to the distributed transaction during a prepare phase, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "initiating", "determining", "participating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
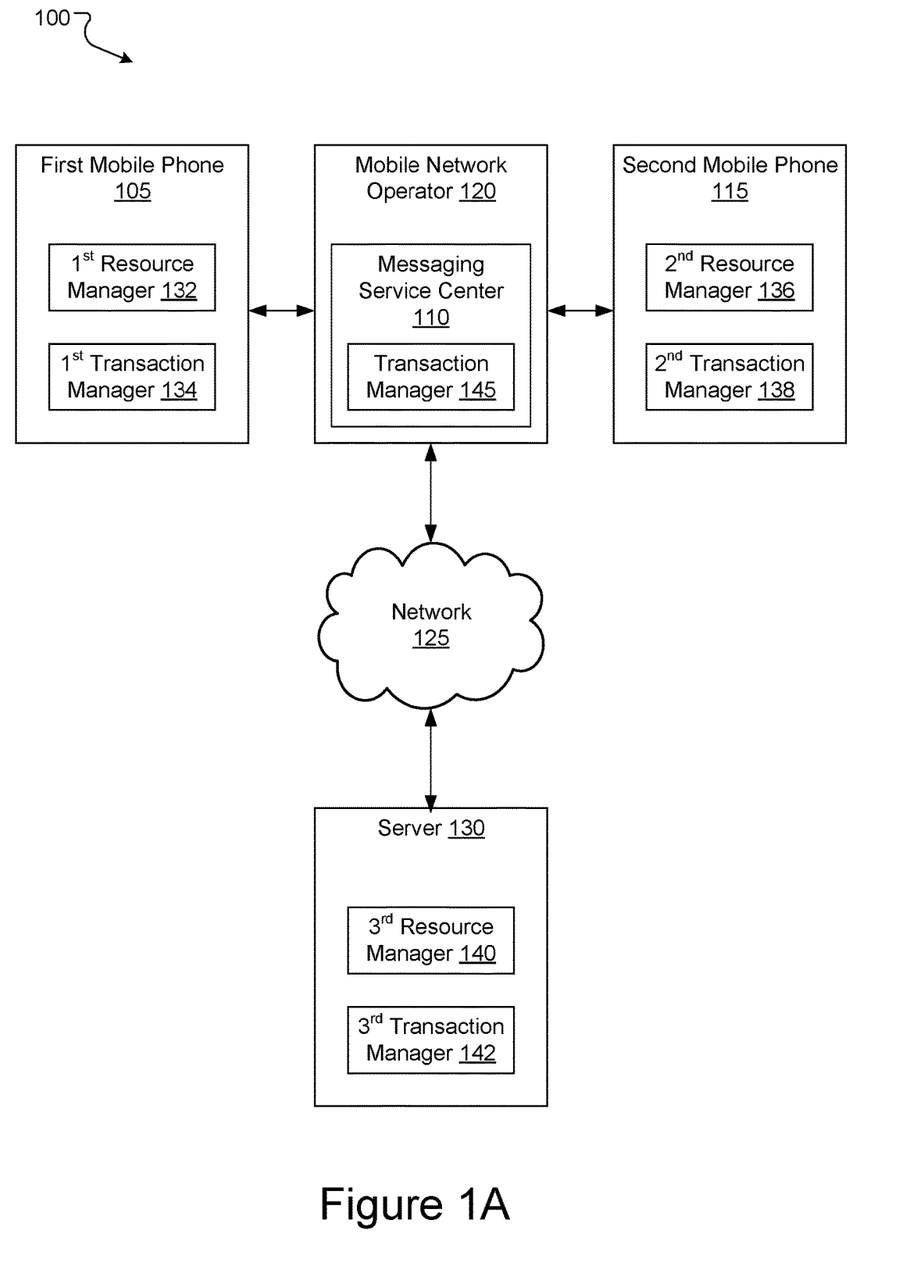
FIG. 1A illustrates an exemplary distributed computing system, in which embodiments of the present invention may operate.

FIG. 1A illustrates an exemplary distributed computing system 100, in which embodiments of the present invention may operate. The distributed computing system 100 may include multiple mobile phones (e.g., first mobile phone 105 and second mobile phone 115) that communicate via a mobile network operator 120. The distributed computing system 100 may further include a server 130 that is connected to the mobile network operator 120 via network 125, which may be a private network (e.g., local area network (LAN), wide area network (WAN), etc.) or a public network (e.g., the internet).

First mobile phone 105 includes a first transaction manager 134 and a first resource manager 132, and second mobile phone 115 includes a second transaction manager 138 and a second resource manager 136. A transaction manager 134, 138 may be a software module that coordinates operations of multiple participants during a distributed transaction. A participant may be another transaction manager or resource manager (e.g., first resource manager 132 and second resource manager 136). Coordinating a distributed transaction includes determining whether each participant can commit to a transaction, directing each participant to commit if all are able, and directing each participant to rollback if not all participating nodes are able to commit.

A resource manager (e.g., first resource manager 132, second resource manager 136) may be a software module that manages a persistent and stable storage system (e.g., in a hard disk drive, a compact flash card, nonvolatile random access memory (NVRAM), etc.). Examples of resource managers include databases and file managers. Each of the first mobile phone 105 and second mobile phone 115 may include one or more applications that can participate in distributed transactions. Each such application can be considered a resource, and can be managed by a distinct resource manager 132, 136. For example, a calendar scheduling program that operates on first mobile phone 105 may be managed by first resource manager 132, and a banking application that operates on first mobile phone 105 may be managed by an additional resource manager (not shown). Alternatively, first resource manager 132 and/or second resource manager 136 may be configured to manage multiple resources (e.g., both the banking application and the calendar scheduling application).

In one embodiment, a distinct resource manager is integrated with (e.g., a module or plugin for) each of one or more applications to provide distributed computing capabilities. In another embodiment, a resource manager and transaction manager may be combined into a single logic component. For example, first resource manager 132 may be combined with first transaction manager 134. Accordingly, first resource manager 132 may act as both a resource manager and a transaction manager (e.g., may coordinate transactions and/or participate in transactions). In a further embodiment, the combined resource/transaction manager may be further combined with the resource (e.g., application or process) that it manages. For example, a calendar scheduling application that operates on first mobile phone may include an integrated resource manager and transaction manager.

In one embodiment, first transaction manager 134 acts as a master coordinator node, and coordinates a distributed transaction between first resource manager 132 and second transaction manager 138. A master coordinator node is a transaction manager that acts on behalf of a process that initiates a distributed transaction (e.g., by initiating a commit operation) to coordinate all participants of the distributed transaction. A master coordinator node must arrive at a commit or abort decision and propagate that decision to all participants. In one embodiment, first transaction manager 134 is configured to initiate a two-phase commit distributed transaction if there are multiple resource managers and/or transaction managers that will participate in the transaction.

In one embodiment, second transaction manager 138 acts as an intermediate coordinator node, and coordinates the distributed transaction for the second resource manager 136. An intermediate coordinator node is a transaction manager that acts on behalf of a process or application that participates in a distributed transaction to coordinate local resource managers and/or additional transaction managers that are participants in the distributed transaction. An intermediate coordinator node gathers information about the participants that it manages, and reports the information to a master coordinator node (e.g., first transaction manager 134). An intermediate coordinator node also receives commit or abort decisions from a master coordinator node, and propagates the decisions to participants that it manages. For example, second transaction manager 138 may manage the distributed transaction for second resource manager 136, which includes forwarding messages from first transaction manager 134 to second resource manager 136, and forwarding messages from second resource manager 136 to first transaction manager 134.

Each resource manager that participates in a distributed transaction may be a participant node of the transaction. During a prepare phase of a two-phase commit distributed transaction, a participant node is asked whether it can commit to the transaction by a coordinator node (e.g., an intermediate coordinator node or a master coordinator node). If the resource manager can commit to the transaction, it sends a commit response to the coordinator node. If the resource manager cannot commit to the transaction, it sends an abort message to the coordinator node. During a commit phase of a two-phase commit distributed transaction, each resource manager receives a commit command if all resource managers indicated that they were able to commit. If one or more of the participating resource managers sent an abort response, then all resource managers receive an abort command during the commit phase.

In one embodiment, first transaction manager 134 and second transaction manager 138 participate in distributed transactions by using a messaging service provided by mobile network operator 120. Examples of messaging services provided by mobile network operator 120 include simple messaging service (SMS), enhanced messaging service (EMS) and multimedia messaging service (MMS). The contents and formatting of exchanged messages depends on the messaging service that is used to participate in distributed transactions. For example, SMS can accommodate a maximum of 160 text characters. In contrast, MMS can accommodate audio data, graphics, text, etc., and can include more than 160 characters.

Each message sent via the messaging service can be formatted according to a mobile distributed computing standard that defines a message structure that can be understood by all nodes in a distributed computing system. In one embodiment, the mobile distributed computing standard defines instructions for distributed computing operations such as prepare, commit and rollback. Under the mobile distributed computing standard, each message, in one embodiment, includes a transaction ID to identify the transaction that the message is associated with. Each message may further include mobile phone numbers (or IP addresses) of participant nodes and/or coordinator nodes. Messages can be constructed such that contents of the messages can be easily extracted and executed by resource managers.

Mobile network operator 120 includes a messaging service center 110 that receives all messages that are sent using the provided messaging service (e.g., SMS, MMS, EMS, etc.). The messaging service center 110 determines appropriate destination mobile phones for the messages, and forwards the messages to those mobile phones. In one embodiment, messaging service center 110 includes a transaction manager 145 that manages transactions between first mobile phone 105 and second mobile phone 115. In such an embodiment, first mobile phone 105 and second mobile phone 115 may not include transaction managers. Instead, all transaction management may be handled by transaction manager 145 from messaging service center 110.

In one embodiment, messaging service center 110 can forward received messages to network locations (e.g., IP addresses) that are connected with network 125. If a received message is directed to a particular network address (e.g., to that of server 130), it converts the message to a format that can be transmitted via the network 125 (e.g., using HTTP). Conversely, if the messaging service center receives a message from server 130, it can reformat the message to a format that can be sent via, for example, SMS, EMS or MMS. The server 130 may thus participate in distributed transactions with first mobile phone 105 and/or second mobile phone 115.

Server 130 includes a third transaction manager 142 and a third resource manager 140. Third transaction manager 142 may initiate distributed transactions that include first mobile phone 105 and/or second mobile phone 115. The third transaction manager 142 may then coordinate third resource manager 140, first transaction manager 134, second transaction manager 138 and/or transaction manager 145 during distributed transactions. For example, if the third transaction manager 142 initiates a distributed transaction, it may send a commit query to the third resource manager 140, to the first transaction manager 134 and to the second transaction manager 138. The first transaction manager 134 may forward the commit query to the first resource manager 132, and the second transaction manager 138 may forward the commit query to the second resource manager 136. The resource managers may then respond to the third transaction manager 142 with acknowledgment messages.

Figure 1B:
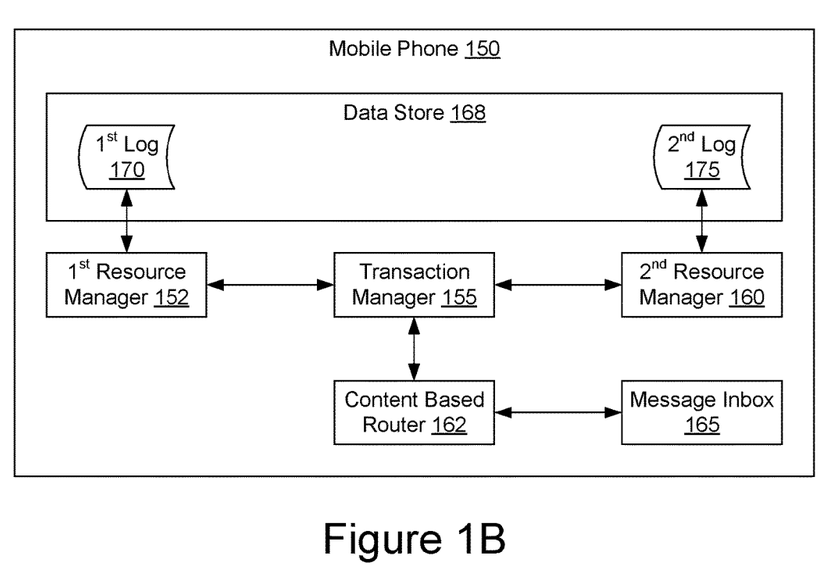
FIG. 1B illustrates a mobile phone, in accordance with one embodiment of the present invention.

FIG. 1B illustrates a mobile phone 150, in accordance with one embodiment of the present invention. Mobile phone 150 is configured to enable participation in distributed transactions. In one embodiment, mobile phone 150 corresponds to first mobile phone 105 and/or second mobile phone 115 of FIG. 1A.

Referring to FIG. 1B, in one embodiment mobile phone 150 includes a content based router 162. All messages received by mobile phone 150 (e.g., SMS messages, MMS messages, EMS messages, etc) may flow through content based router 162. Content based router 162 examines received messages to determine whether they are associated with a distributed transaction. Preferably, each message that is associated with a distributed transaction includes a transaction ID that identifies that distributed transaction. In one embodiment, content based router 162 includes a table of distributed transactions in which mobile phone 150 is participating. Each entry may identify where to forward messages that are associated with a particular distributed transaction. For example, in one embodiment, all messages associated with any distributed transaction are forwarded to transaction manager 155. Alternatively, mobile phone 150 may include multiple transaction managers, and the entries in the table may identify different transaction managers to forward messages to.

If a received message is not associated with a distributed transaction, then content based router 162 forwards the message to message inbox 165. Message inbox 165 may then notify a user of mobile phone 150 that a new message has been received, and the user may read the message therefrom. In contrast, the user may not be notified when messages associated with a distributed transaction are received. In one embodiment, messages associated with distributed transactions are sent and received transparently to the user. Alternatively, the user may be notified when such messages are sent and/or received.

Transaction manager 155 can manage multiple resource managers (e.g., first resource manager 152 and second resource manager 160). When transaction manager 155 receives a message from content based router 162, it determines which resource manager is participating in the distributed transaction associated with the message. Transaction manager 155 can then ask the appropriate resource manager whether it can commit to the transaction (if the transaction is in the prepare phase), or direct the resource manager to commit or rollback (if the transaction is in the commit phase). Transaction manager 155 can also forward contents of the message to the appropriate resource manager (e.g., to notify the resource manager what state changes will occur if the distributed transaction is successful).

First resource manager 152 and second resource manager 160 may each participate in distributed transactions via transaction manager 155. Alternatively, first resource manager 152 and second resource manager 160 may be managed by different transaction managers, or first resource manager 152 and second resource manager 160 may each include an integrated transaction manager. To ensure the Atomicity property, the first resource manager 152 and second resource manager 160 maintain a first log 170 and second log 175, respectively. The logs may be undo logs (log of committed changes that occur during a distributed transaction) and/or redo logs (log of uncommitted changes that occur during a distributed transaction). The first log 170 and second log 175 identify all state changes that will occur if a distributed transaction is successful. The logs may therefore be used to rollback to a state that existed prior to the distributed transaction if the transaction is aborted before completion.

In one embodiment, first log 170 and second log 175 are maintained in data store 168. Data store 168 may be a hard disk drive, compact flash card, NVRAM, secure digital (SD) card, or other persistent storage that can be included in a mobile phone.

Figure 2:
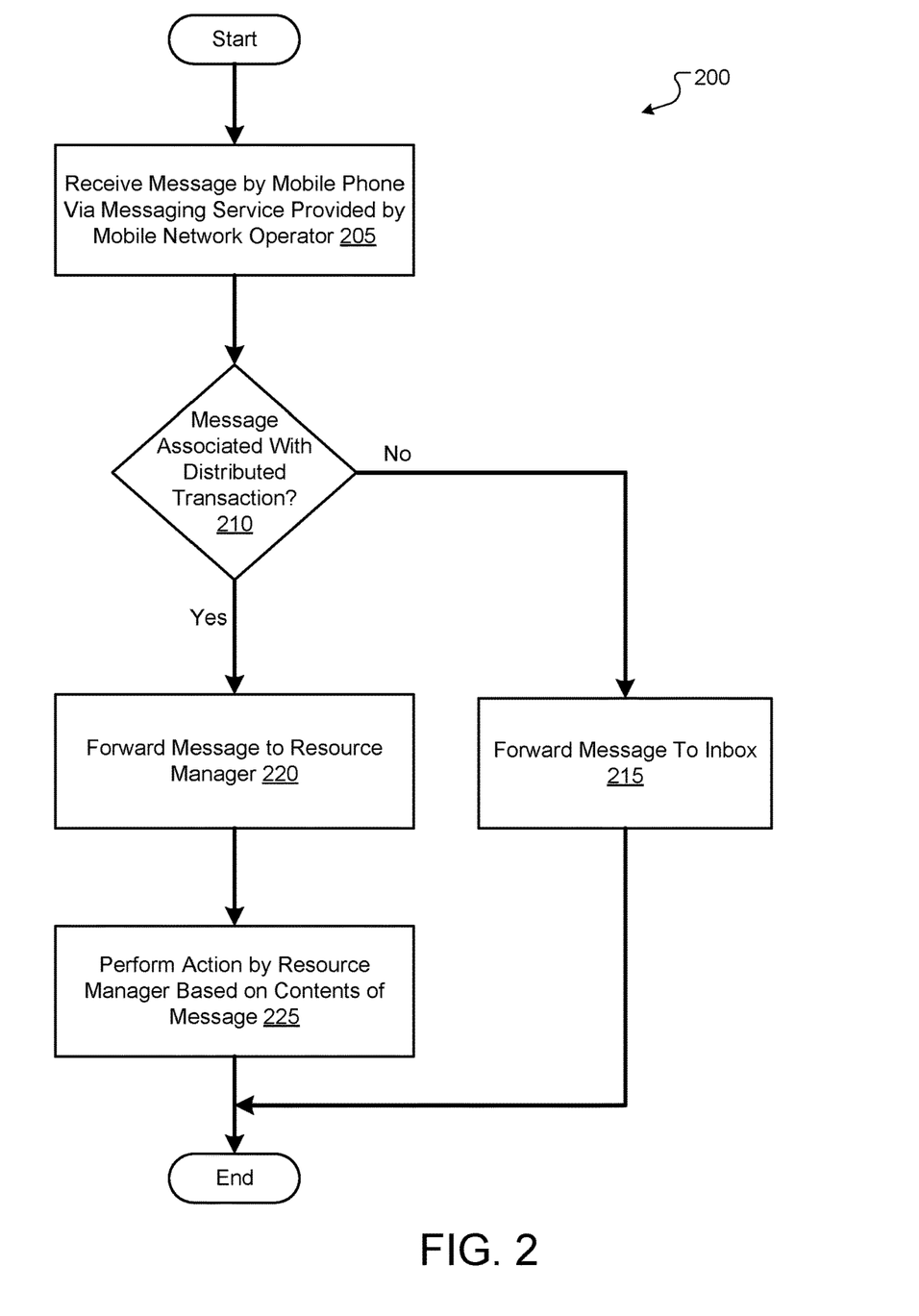
FIG. 2 illustrates a flow diagram of one embodiment for a method of participating in a distributed transaction by a mobile phone.

FIG. 2 illustrates a flow diagram of one embodiment for a method 200 of participating in a distributed transaction by a mobile phone. The method is performed by processing logic that comprises hardware (e.g., circuitry, dedicated logic, programmable logic, microcode, etc.), software (such as instructions run on a processing device), or a combination thereof. In one embodiment, method 200 is performed by mobile phone 150 of FIG. 1B.

Referring to FIG. 2, method 200 includes receiving a message by a mobile phone via a messaging service provided by a mobile phone operator (block 205). The message may be, for example, an SMS message, an MMS message, or an EMS message. At block 210, processing logic (e.g., content based router 162 of FIG. 1B) determines whether the message is associated with a distributed transaction. This may be accomplished by parsing the message to identify a transactional ID included therein. Messages may also be identified as transactional messages based on their structure, or by a distributed transaction flag included in the message. If the message is associated with a distributed transaction, the method proceeds to block 220. If the message is not associated with a distributed transaction, the method proceeds to block 215.

At block 215, the message is forwarded to a message inbox. From the message inbox, a user of the mobile phone can read the message and/or respond to the message.

At block 220, the message is forwarded to a resource manager. The resource manager may be a participant in a distributed transaction. In one embodiment, the message is forwarded to a transaction manager, which may in turn forward it to the resource manager. In a further embodiment, the resource manager may include the functionality of a transaction manager. The transaction manager may act as a coordinator node to coordinate the transaction between the resource manager and at least one participant node that is remote from a mobile phone on which the resource manager operates. In another embodiment, the resource manager acts as a participant node to receive distributed transaction instructions from a coordinator node that is remote from the mobile phone. The remote coordinator node may be a transaction manager operated by a server, by a mobile network operator, or by another mobile phone.

At block 225, the resource manager performs an action based on the contents of the message. For example, the message may direct the resource manager to commit to a state change or to rollback to a previous state, or may ask the resource manager whether it can commit to the transaction. The method then ends.

Figure 3A:
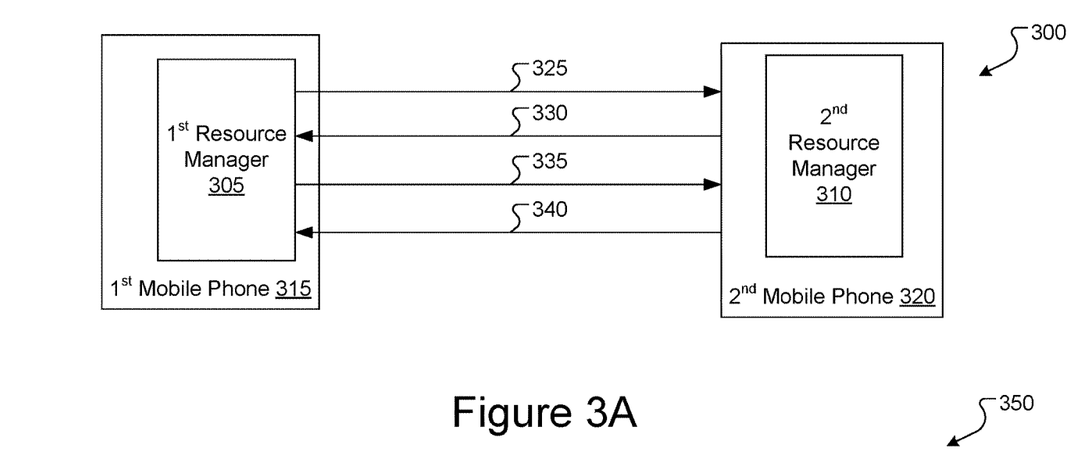
FIG. 3A is a transaction diagram illustrating messages flowing through a distributed computing system, in accordance with one embodiment of the present invention.

FIG. 3A is a transaction diagram illustrating messages flowing through a distributed computing system 300, in accordance with one embodiment of the present invention. In one embodiment, the distributed computing system 300 includes a first mobile phone 315 having a first resource manager 305 and a second mobile phone 320 having a second resource manager 310. In the illustrated embodiment, the first resource manager 305 and second resource manager 310 each include the functions of transaction managers. In one embodiment, the first resource manager 305 acts as a coordinator node, and the second resource manager 310 acts as a participant node.

As the coordinator node, first resource manager 305 initiates and manages a specific distributed transaction. Managing the distributed transaction includes determining whether each participating node (e.g., second resource manager 310) can commit to a transaction, directing each participating node to commit if all are able, and directing each participating node to rollback (undo changes caused by the transaction) if not all participating nodes are able to commit.

Any node that includes a transaction manager in the distributed computing system 300 is capable of operating as a coordinator node. Generally, it is a node at which a transaction is begun that operates as the coordinator node for that distributed transaction. However, it is not a requirement that a node that begins a transaction act as coordinator node for that transaction. Moreover, a coordinator node can hand responsibility over to another node, causing that other node to become the coordinator node.

In one embodiment, the first resource manager 305 coordinates a two-phase commit distributed transaction between itself and second resource manager 310. During a prepare phase of the two-phase commit transaction, first resource manager 305 sends a commit query 325 to each of the participant nodes asking whether they can commit to the transaction. The first resource manager 305 then waits for a response from the second resource manager 310.

Second resource manager 310 can respond to the commit query 325 with a commit response or an abort response. In one embodiment, second resource manager 310 sends a commit response 330 to first resource manager 305, indicating that second resource manager 310 can commit to the distributed transaction. Upon receiving the commit response, first resource manager 305 can commit to the transaction. First resource manager 305 can then send a commit message 335 to second resource manager 310, directing it to commit to the distributed transaction. Once second resource manager 310 has successfully committed the transaction, it sends an acknowledgement message 340 back to first resource manager 305 to notify it that the transaction was successfully committed.

In an example of a two-phase commit distributed transaction between two mobile phones, a user of first mobile phone 315 may use a calendar application to send a meeting invitation to second mobile phone 320. The first resource manager 305 (which in this example also performs the actions of a transaction manager) starts a transaction for the meeting, and sends a transaction request (including a transactional ID) to the second resource manager 310 using, for example, SMS, MMS or EMS. Second mobile phone 320 prompts a user to indicate whether he/she can attend the meeting. If the user answers in the affirmative, the second resource manager 310 adds the meeting to a calendar program on second mobile phone 320. Second resource manager 310 also sends a message to first resource manager 305 stating that the meeting was accepted, and registering itself as a member of the distributed transaction.

First resource manager 305 determines that it can commit to the transaction, and sends a prepare message to second resource manager 310. Second resource manager 310 verifies that it can make any state changes permanent, and sends a commit response back to first resource manager 305. First resource manager 305 then sends a commit message back to second resource manager 310 notifying it to permanently commit any necessary state changes. Finally, second resource manager 310 sends an acknowledgement message back to first resource manager 305. At the end of these message exchanges, both first mobile phone 315 and second mobile phone 320 include a calendar entry for a meeting. All exchanged messages can occur via a messaging service provided by a mobile network operator.

Figure 3B:
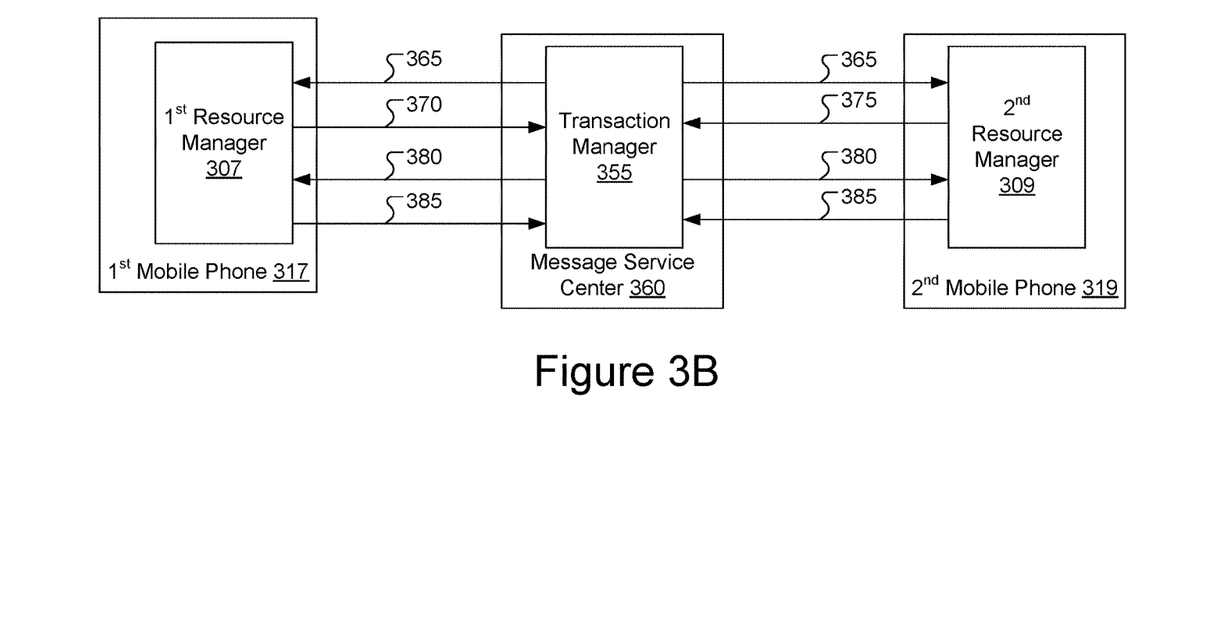
FIG. 3B is a transaction diagram illustrating messages flowing through a distributed computing system, in accordance with another embodiment of the present invention.

FIG. 3B is a transaction diagram illustrating messages flowing through a distributed computing system 350, in accordance with another embodiment of the present invention. In one embodiment, the distributed computing system 350 includes a first mobile phone 317 having a first resource manager 307, a second mobile phone 319 having a second resource manager 309, and a message service center 360 of a mobile network operator having a transaction manager 355. In one embodiment, the transaction manager 355 acts as a coordinator node, and the first resource manager 307 and second resource manager 309 act as participant nodes.

In one embodiment, the transaction manager 355 coordinates a two-phase commit distributed transaction between first resource manager 307 and second resource manger 309. The distributed transaction may be requested by either the first resource manager 307 or the second resource manager 309. During a prepare phase of the two-phase commit transaction, transaction manager 355 sends a commit query 365 to both the first resource manager 307 and the second resource manager 309 asking them whether they can commit to the distributed transaction. The transaction manager 355 then waits for responses.

Both first resource manager 307 and second resource manager 309 can respond to the commit query 365 with a commit response or an abort response. In one embodiment, first resource manager 307 sends an abort response 370 to transaction manager 355, and second resource manager 309 sends a commit response 375 to transaction manager 355. Since not all participant nodes responded with a commit response, the distributed transaction will not proceed. Accordingly, transaction manager 355 sends a rollback message 380 to first resource manager 307 and second resource manager 309. First resource manager 307 and second resource manager 309 can then rollback to respective previous states that existed prior to the distributed transaction. First resource manager 307 and second resource manager 309 can then send acknowledgement messages 385 back to transaction manager 355.

Figure 4:
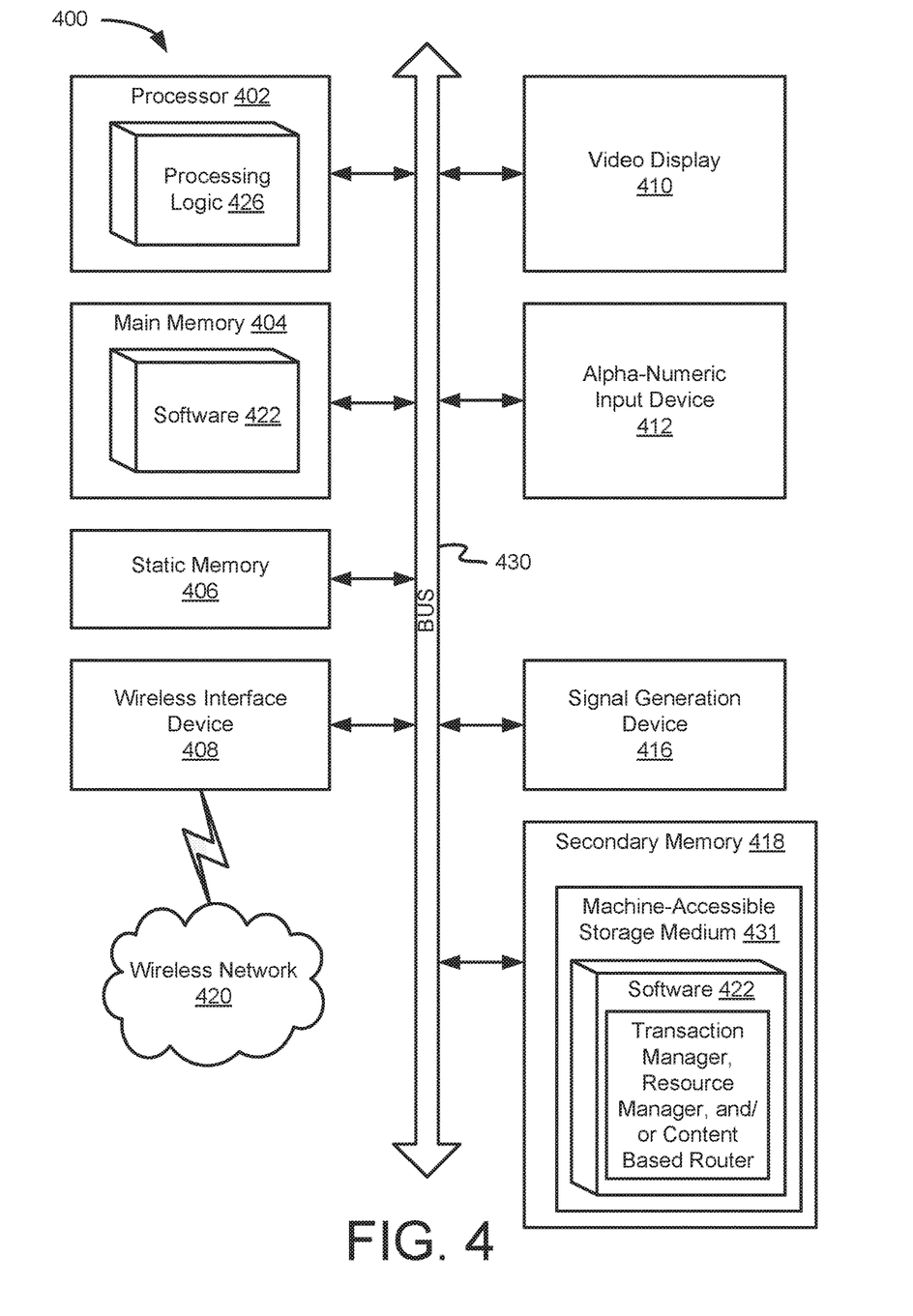
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. In one embodiment, the machine is a mobile phone, which may be connected to other mobile phones and/or additional machines (e.g., servers, desktop computers, personal digital assistants (PDAs), etc.) via a mobile network operator.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a wireless interface device 408 for communicating with a wireless network operator. The computer system 400 also may include a video display unit 410 (e.g., a liquid crystal display (LCD) or a vacuum fluorescent display (VFD)), an alphanumeric input device 412 (e.g., a keypad), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store a transaction manager, resource manager and/or content based router 162 (e.g., transaction manager 155, first resource manager 152, content based router 162 etc. of FIG. 1B), and/or a software library containing methods that call transaction managers, resource managers and/or content based routers. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device of a first mobile device associated with a distributed transaction, a message via a messaging service provided by a mobile network operator;
   determining, by a content based router of the first mobile device, that the message is associated with the distributed transaction by determining that the message comprises a transaction identifier that corresponds with an entry in a transaction table of the content based router, the entry identifying the distributed transaction and a destination of where to forward the message;
   forwarding, by the processing device of the first mobile device, the message to a first resource manager resident on the first mobile device, the first resource manager corresponding to the destination of where to forward the message; and
   performing, by the first resource manager, an action associated with the distributed transaction in view of contents of the message.

2. The method of claim 1, wherein the action is selected from the group consisting of:
   voting whether to commit to a state change of the distributed transaction;
   committing the state change; and
   rolling back the state change.

3. The method of claim 1, comprising:
   coordinating, by a first transaction manager resident on the first mobile device, operations of a plurality of participants of the distributed transaction, wherein the plurality of participants are selected from the group consisting of the first resource manager, a second resource manager resident on a second mobile device, and a second transaction manager resident on the second mobile device, wherein the coordinating of the operations comprises:
   determining whether each of the plurality of participants is able to commit to a state change of the distributed transaction;
   in response to determining each of the plurality of participants is able to commit, causing each participant to commit to the state change; and
   in response to determining at least one of the participants is not able to commit, causing each of the participants to rollback the state change.

4. The method of claim 3, further comprising:
   receiving, by the first transaction manager, the message from the content based router;
   determining, by the first transaction manager, that the first resource manager and the second resource manager are participating in the distributed transaction associated with the message, wherein the first transaction manager manages the first resource manager and the second resource manager; and
   forwarding, by the first transaction manager, contents of the message to the first resource manager to notify the first resource manager of state changes that are to occur in response to the first resource manager and the second resource manager committing to the distributed transaction.

5. The method of claim 1, wherein the first resource manager is integrated with an application that operates on the first mobile device to provide distributed computing capabilities.

6. The method of claim 1 further comprising:
   coordinating, by a single logic component comprising the first resource manager and a first transaction manager resident on the first mobile device, operations of a plurality of participants of the distributed transaction, wherein the plurality of participants are selected from the group consisting of the first resource manager, a second resource manager resident on a second mobile device, and a second transaction manager resident on the second mobile device, wherein the coordinating of the operations of the plurality of participants of the distributed transaction and participating in the distributed transaction are by the single logic component.

7. The method of claim 6, wherein:
   an application that operates on the first mobile device comprises the single logic component, wherein the single logic component is to manage the application.

8. The method of claim 1 further comprising:
   coordinating, by a master coordinator node, first operations of the distributed transaction between the first resource manager and a second transaction manager, wherein a first transaction manager resident on the first mobile device is acting as the master coordinator node, wherein the second transaction manager is resident on a second mobile device, and wherein the coordinating of the first operations comprises:
   initiating, by the master coordinator node, the distributed transaction by initiating a commit operation to coordinate the first resource manager and the second transaction manager;
   determining, by the master coordinator node, a decision of commit or abort; and
   propagating, by the master coordinator node, the decision to the first resource manager and the second transaction manager.

9. The method of claim 8, wherein the initiating, by the master coordinator node, of the distributed transaction is in response to determining that a plurality of participants of the distributed transaction are able to commit to participating in the distributed transaction, wherein the distributed transaction is a two-phase commit distributed transaction.

10. The method of claim 8 further comprising:
coordinating, by an intermediate coordinator node, second operations of the distributed transaction for a subset of a plurality of participants of the distributed transaction, the subset comprising a second resource manager, wherein the second resource manager is resident on the second mobile device, wherein the coordinating of the second operations comprises:
gathering, by the intermediate coordinator node, information about the subset;
reporting, by the intermediate coordinator node, the information to the master coordinator node;
receiving, by the intermediate coordinator node, the decision from the master coordinator node; and
propagating, by the intermediate coordinator node, the decision to the subset.

11. The method of claim 10, wherein each resource manager of the plurality of participants is a participant node of the distributed transaction, the method further comprising:
transmitting, by a coordinator node selected from the group consisting of the master coordinator node and the intermediate coordinator node, a request to a first participant node and a second participant node to determine whether each of the first participant node and the second participant node is able to commit to the distributed transaction;
receiving, by the coordinator node, a commit response from the first participant node responsive to the first participant node being able to commit to the distributed transaction;
receiving, by the coordinator node, an abort message from the second participant node responsive to the second participant node not being able to commit to the distributed transaction;
and
in response to receiving the abort message, transmitting, by the coordinator node, an abort command to the first participant node and the second participant node.

12. The method of claim 11, wherein the message comprises a mobile device number or an internet protocol (IP) address for one or more of the first participant node, the second participant node, the master coordinator node, or the intermediate coordinator node.

13. The method of claim 1 further comprising:
maintaining, via the first resource manager, a first log of participation in distributed transactions; and
maintaining, via a second resource manager, a second log of participation in distributed transactions, wherein:
responsive to the first log and the second log comprising redo logs of uncommitted changes that occur during the distributed transaction, the first log and the second log identify state changes that are to occur in response to each participant of the distributed transaction committing to the distributed transaction; and
responsive to the first log and the second log comprising undo logs of committed changes that occur during the distributed transaction, the first log and the second log are used to rollback to a state that existed prior to the distributed transaction in response to the distributed transaction being aborted before completion.

14. A non-transitory computer readable medium including instructions that, when executed by a processing device of a first mobile device, cause the processing device to:
receive, by the first mobile device associated with a distributed transaction, a message via a messaging service provided by a mobile network operator;
determine, by a content based router of the first mobile device, that the message is associated with the distributed transaction by determining that the message comprises a transaction identifier that corresponds with an entry in a transaction table of the content based router, the entry identifying the distributed transaction and a destination of where to forward the message;
forward, by the processing device of the first mobile device, the message to a first resource manager resident on the first mobile device, the first resource manager corresponding to the destination of where to forward the message; and
perform, by the first resource manager, an action associated with the distributed transaction in view of contents of the message.

15. The non-transitory computer readable medium of claim 14, wherein the action is selected from a group consisting of:
voting whether to commit to a state change of the distributed transaction;
committing the state change; and
rolling back the state change.

16. The non-transitory computer readable medium of claim 14, wherein the instructions, when executed by the processing device, further cause the processing device to:
coordinate, by a first transaction manager resident on the first mobile device, operations of a plurality of participants of the distributed transaction, wherein the plurality of participants are selected from the group consisting of the first resource manager, a second resource manager resident on a second mobile device, and a second transaction manager resident on the second mobile device, and wherein to coordinate the operations, the processing device is to:
determine whether each of the plurality of participants is able to commit to a state change of the distributed transaction;
in response to determining each of the plurality of participants is able to commit, cause each participant to commit to the state change; and
in response to determining at least one of the participants is not able to commit, cause each of the participants to rollback the state change.

17. A system comprising:
a hardware interface at a first mobile device associated with a distributed transaction, wherein the hardware interface is to receive a message via a messaging service provided by a mobile network operator; and
a hardware processing device at the first mobile device and communicatively coupled with the hardware interface, wherein the hardware processing device is to:
determine, by a content based router of the first mobile device, that the message is associated with the distributed transaction by determining that the message comprises a transaction identifier that corresponds with an entry in a transaction table of the content based router, the entry identifying the distributed transaction and a destination of where to forward the message;

forward, by the hardware processing device, the message to a first resource manager resident on the first mobile device, the first resource manager corresponding to the destination of where to forward the message; and perform, by the first resource manager, an action associated with the distributed transaction in view of contents of the message.

18. The system of claim 17, wherein the action is selected from the group consisting of:
voting whether to commit to a state change of the distributed transaction;
committing the state change; and
rolling back the state change.

19. The system of claim 17, wherein the hardware processing device is further to:
coordinate, by a first transaction manager resident on the first mobile device, operations of a plurality of participants of the distributed transaction, wherein the plurality of participants are selected from a group consisting of the first resource manager, a second resource manager resident on a second mobile device, and a second transaction manager resident on the second mobile device, wherein to coordinate the operations, the hardware processing device is to:
determine whether each of the plurality of participants is able to commit to a state change of the distributed transaction;
in response to determining each of the plurality of participants is able to commit, cause each participant to commit to the state change; and
in response to determining at least one of the participants is not able to commit, cause each of the participants to rollback the state change.

20. The system of claim 17, wherein the hardware processing device is further to:
coordinate, by a master coordinator node, first operations of the distributed transaction between the first resource manager and a second transaction manager, wherein a first transaction manager resident on the first mobile device is acting as the master coordinator node, wherein the second transaction manager is resident on a second mobile device, and wherein to coordinate the first operations, the hardware processing device is to:
initiate, by the master coordination node, the distributed transaction by initiating a commit operation to coordinate the first resource manager and the second transaction manager;
determine, by the master coordinator node, a decision of commit or abort; and
propagate, by the master coordinator node, the decision to the first resource manager and the second transaction manager; and
coordinate, by an intermediate coordinator node, second operations for a subset of a plurality of participants of the distributed transaction, the subset comprising a second resource manager, wherein to coordinate the second operations, the hardware processing device is to:
gather, by the intermediate coordinator node, information about the subset;
report, by the intermediate coordinator node, the information to the master coordinator node;
receive, by the intermediate coordinator node, the decision from the master coordinator node; and
propagate, by the intermediate coordinator node, the decision to the subset.

* * * * *